Jan. 29, 1929. 1,700,311
J. N. FENDER
UNIVERSAL JOINT FOR PNEUMATIC CONVEYERS
Filed Nov. 22, 1926
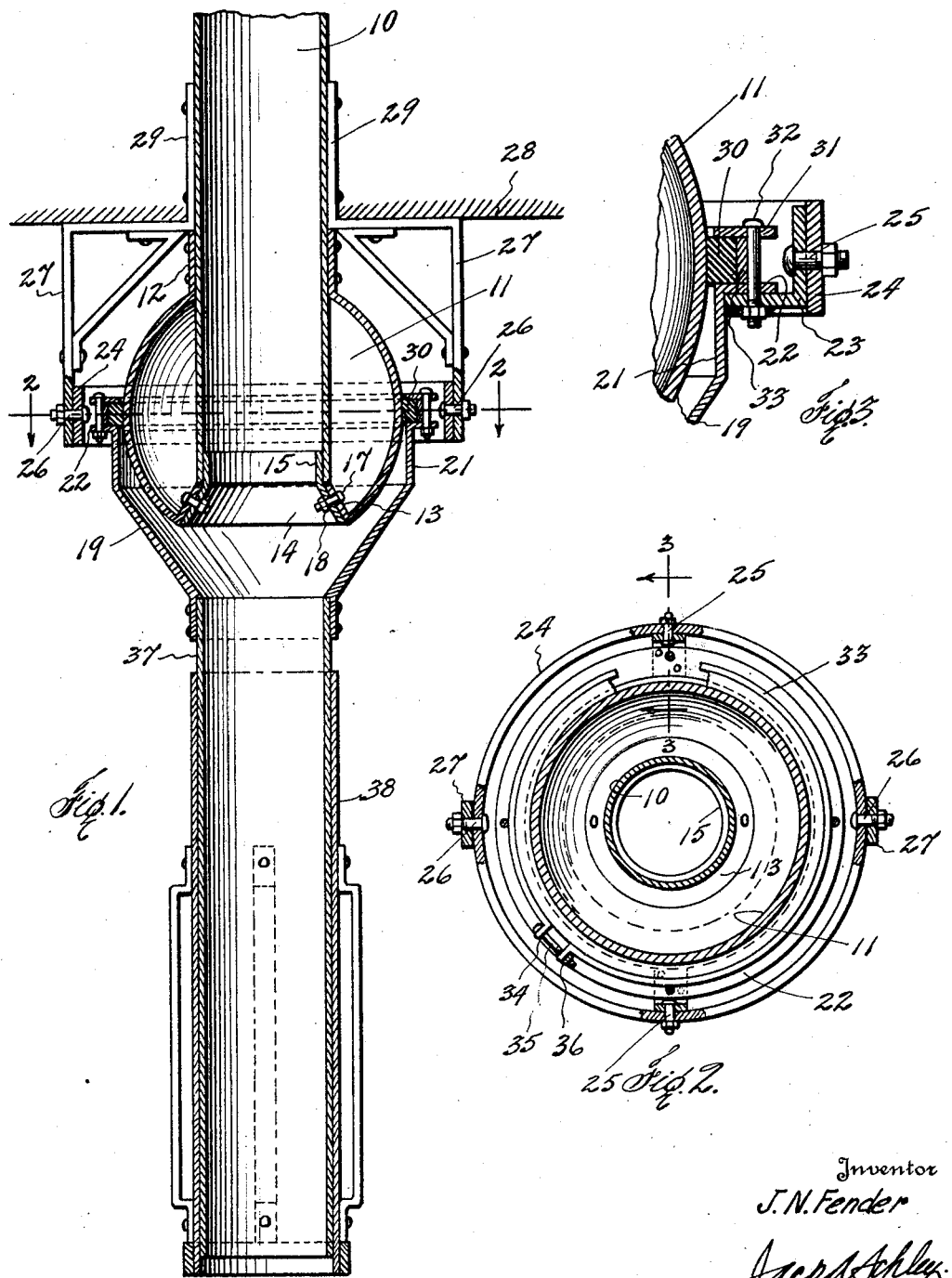
Inventor
J. N. Fender Patented Jan. 29, 1929.

1,700,311

UNITED STATES PATENT OFFICE.

JOSEPH N. FENDER, OF DALLAS, TEXAS, ASSIGNOR TO ELK MANUFACTURING COMPANY, OF ELK CITY, OKLAHOMA, A CORPORATION OF OKLAHOMA.

UNIVERSAL JOINT FOR PNEUMATIC CONVEYERS.

Application filed November 22, 1926. Serial No. 149,861.

This invention relates to new and useful improvements in universal joints for pneumatic conveyers.

The object of the invention is to provide a universal joint which will be substantially air-tight and which will give a freedom of action.

A further object of the invention is to provide a universal joint which will take a considerable amount of wear and which will be free from fabric boots and the like.

A particular object of the invention is to provide parts for taking the wear, which are arranged so as to be readily replaced.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a vertical sectional view of a portion of a pneumatic conveyer, including a universal joint, constructed in accordance with my invention, Fig. 2 is a horizontal cross-sectional view taken on the line 2—2 of Fig. 1, and Fig. 3 is an enlarged transverse sectional view taken on the line 3—3 of Fig. 2.

In the drawings the numeral 10 designates a fixed suction flue, or pipe, which may be suitably supported. A hollow ball member 11 has an upstanding collar 12 at its upper end surrounding and snugly embracing the flue. The lower end of the ball is open and is provided with an internal flaring annular flange 13 secured to the lower end of the flue which telescopes into said ball.

A metal liner 14 is fitted snugly in the flange 13 and has its upper annular end 15 telescoping into the lower end of the flue. The liner is removably fastened to the flange 13 by bolts 17 and nuts 18. This liner is made of metal or other suitable material, and being in the path of the material being conveyed, takes the wear, and when worn may be renewed by removing the bolts 17. The ball 11 forms one member of a universal joint, while a funnel shaped member 19 forms the other portion and receives the lower portion of the ball.

The member 19 terminates at its upper end in an annular collar 21 having an outwardly directed circular flange 22. At diametrically opposite points angular brackets 23 are fastened to the under side of said flange and extends upwardly. These brackets fit within a ring 24 and are fulcrumed therein on bolts 25. At right angles to the bolts 25 the ring is diametrically fulcrumed on bolts 26 carried by the lower ends of angular hangers 27 suitably fastened to an overhanging support 28, and preferably formed with extensions 29 attached to the flue 10. From this it will be seen that the member 19 is free to swing upon the bolts 25 in the ring and the ring is free to swing at right-angles thereto on the bolts 26. This suspension makes for universal movement.

For forming an air-tight joint, I provide a split packing ring 30 surrounding and in contact with the ball 11 and confined on the flange 22 by a retaining ring 31 secured to said flange by bolts 32. The packing ring is surrounded by a metal compression ring 33, which is split and provided with out-turned ears 34, as is shown in Fig. 2. The ears are connected by a bolt 35 having a nut 36. By tightening up the nut, the ears are drawn together, whereby the ring is contracted, and the packing ring 30 thus forced into close contact with the surface of the ball. When the member 19 is swung the ring 30 will ride over the surface of the ball 11 and exclude air from entering the joint. The liner 14 and the ring 30 are practically the only wearing parts, and, as is obvious, may be easily replaced when worn.

Where the device is used for elevating cotton the usual spout 37 and telescoping sleeve 38 may be attached to the member 19. It is to be understood that any elevating pipe or flue may be attached to the member 19 and the parts may be mounted in any position that will properly function. It will be noted that substantially all the exposed parts of the joint may be made of metal. To compensate wear, the ring 30 may be further compressed by contracting the ring 33, thus assuring a tight joint.

Various changes in the size and shape of the different parts, as well as modifications and alterations, may be made within the scope of the appended claims.

What I claim, is:

1. In a universal joint for a pneumatic conveyer, the combination of a flue, a ball member through which the open end of the flue extends, a funnel member receiving the ball member and having an outwardly directed lateral flange at its open end, a flexible solid packing mounted upon said flange to surround the ball member, a tension ring at said flange surrounding the packing and provided with adjustable tensioning means for holding the packing in contact with the ball member, and means secured to the flue for suspending the funnel for universal movement relative to the ball member.

2. In a universal joint for a pneumatic conveyer, the combination of a flue, a fixed ball member through which the open end of the flue extends, a funnel member receiving the ball member and having a lateral flange at its open end, a freely movable intake spout depending from said funnel member, a solid resilient packing ring mounted upon said flange for bodily radial movement and surrounding the ball member, a retaining ring carried by the funnel member above said packing ring to prevent vertical expansion thereof under radial pressure, a tension band contacting with substantially the entire outer periphery of the packing ring for bodily forcing the same into contact with the ball member, and means secured to the flue for suspending the funnel for universal movement relative to the ball member.

In testimony whereof I affix my signature.

JOSEPH N. FENDER.